July 18, 1950
A. H. RODECK
2,515,840
REFRIGERATING DEVICE
Filed Feb. 21, 1946
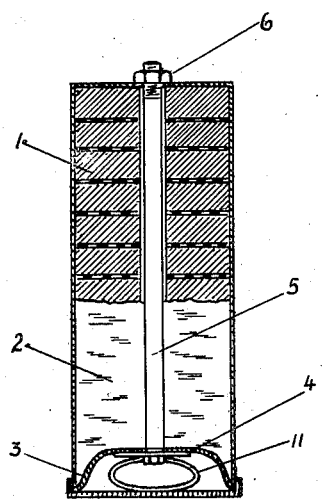
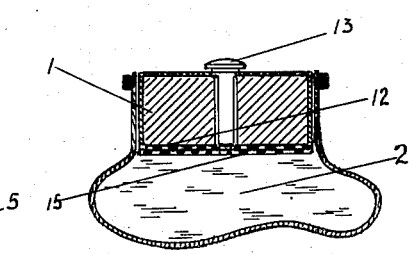
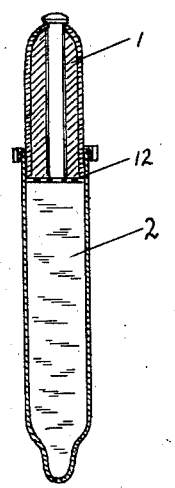
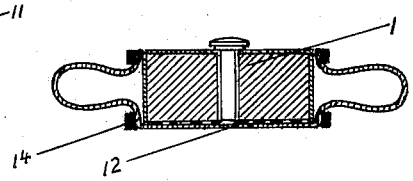
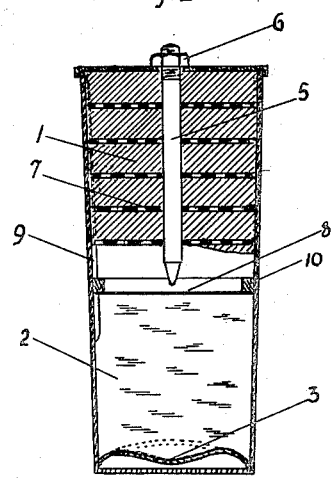
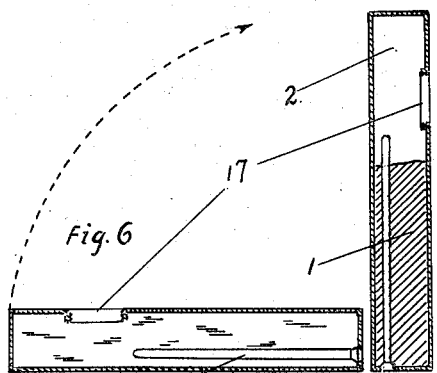
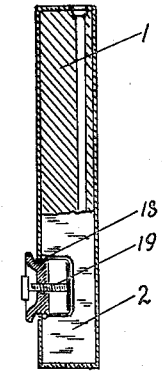
Inventor
Armin H. Rodeck Patented July 18, 1950

2,515,840

UNITED STATES PATENT OFFICE 2,515,840

REFRIGERATING DEVICE

Armin H. Rodeck, Watertown, N. Y.

Application February 21, 1946, Serial No. 649,215

3 Claims. (Cl. 62—94)

My invention relates to a refrigerating device on a similar principle as that described in the U. S. Patent No. 2,336,571, i. e. the dissolution of an eutectic salt block in water, but with features implying an important improvement upon the aforesaid construction.

It is the object of this invention to provide the same effect of controlled production of cold as in Patent No. 2,336,571, however without need of a separate water receptacle or water compartment as described in said patent, economizing under otherwise equal conditions 30% of the space occupied with the previous system.

A further object of the invention is to provide a container with one or more resilient walls in order to accommodate the cooler to the shape of the object to be cooled, like ice bags, ice caps, cooling covers or wrappings, ice water bottles, etc. and to provide means for regulating the contact between refrigerating salt and dissolving liquid; in other words controlling the production of cold.

Another object is to provide a thin diaphragm as a partition between salt and water as long as the device is not being used; said partition is to be pierced when cooling is needed.

A further object of the invention is to provide a method of simple and fast regeneration of the used up salt after the cooling action has ended, by evaporating the water in the same container used for the cooling process in order to reclaim the acting salt.

Another object of the invention relates to means for filling the device with liquid salt without letting the latter enter the resilient part of the device, f. i. the ice bag of the ice cap.

Other objects and advantages will become apparent from the following description taken in connection with the accompanying drawing, in which Fig. 1 is a schematic vertical cross sectional view showing the interior of the refrigerator, Fig. 2 is a schematic cross sectional view showing the same kind of refrigerator, but with a slightly tapered container, Fig. 3 is a cross sectional view showing the whole water compartment as a resilient part of the refrigerator, Fig. 4 is the same vertical cross section as Fig. 3, showing the resilient part of the refrigerator stretched to a straight surface on the bottom of the device, Fig. 5 is a schematic vertical cross sectional view showing a flat parallelepipedic form of the device, Fig. 6 is a vertical cross sectional view of a cooling unit for rapid dehydration in its position for evaporating the water, Fig. 7 shows a vertical cross sectional view of the same cooling unit, however in a position for letting the liquid salt solidify, Fig. 8 shows a vertical cross section of the same cooling unit, but this time ready for cooling action.

Fig. 1 shows the refrigerator with a block of salt 1 (in the upper part), the dissolving liquid 2 (in the lower part) and the resilient wall 3 (made f. i. of rubber) on the bottom of the container, which by means of the disk 4, the screw 5 and the regulating nut 6 on the top of the device may be raised or lowered at will in order to achieve a more or less intimate contact between salt and water, and to control in this manner the production of cold.

The refrigerating container (as shown in Fig. 2), is slightly tapered so that the salt block formed according to the smaller part of the cone, may slide freely in the wider i. e. upper part of the container where it is kept by the screw 5, the regulating nut 6 and a number of perforated disks 7 which are fastened to the screw spindle 5 and which are holding the salt block together as a compact mass, even when its lower part is already dissolved, while the cooling process is still going on.

In order to avoid premature function of the cooler, a thin diaphragm 8 is provided to keep salt and water separated as long as no production of cold is intended. In order to start the cooling process the nut 6 is turned, lowering the screw 5 together with the block 1, which is kept from turning by a suitable groove and a corresponding rib 9 in the container wall, until the point on the bottom end of the screw pierces the diaphragm achieving a connection between salt and water; the latter will rise because the resilient wall 3 (or any other resilient member inside the water compartment 2), being compressed when the diaphragm holder 10 after water has been filled in, is pressed in its right position, will expand as soon as the pressure inside the compartment 2 is released. The contact between salt and water can be controlled at will by raising or lowering the salt block by means of the screw 5, turning the regulating nut 6 in the corresponding direction.

In both cases (as shown in Fig. 1 and Fig. 2), a thermostat may replace the action of the regulating nut. In Fig. 1 a bimetallic bow 11 is shown in a schematical way for purpose of illustration, acting as a thermostat. When the temperature inside the cooler rises, the bimetallic bow moves the resilient wall upwards improving the contact between salt and water and increasing the production of cold, and vice versa. Thus the temperature of the device is kept automatically within close limits as long as there is solid salt to be dissolved.

In Fig. 3 the resilient wall is represented by the whole water compartment 2 which follows the shape of the body to be cooled (f. i. a bag or cap or soft cover), while the refrigerating salt is contained in the upper part 1 of the device with the partition 12 perforated so that the water level raised by outside pressure on the resilient wall gets in contact with the salt and thus initiates the cooling action. When the cooling charge is used up, the knob 13 on the top of part 1 is removed and the solution poured out for regeneration, i. e. for evaporation of the water and for reclaiming the hot salt in liquid but concentrated status. In order to pour this salt back into part 1 without letting it penetrate into part 2, a clamp 14 (as shown in Fig. 4), is temporarily tightened around part 1 in such a manner that the resilient wall forms a straight surface underneath the perforated partition 12, being stretched tight against it. The salt solidifies in this position while cooling down to room temperature whereupon the clamp is removed, the device being ready for the next refrigerating action. For starting it, a certain quantity of water is poured in through the opening on the top of part 1 and thereupon the knob 13 is screwed in and tightened.

Instead of introducing the liquid salt in the device through the opening on the top, part 1 may be manufactured with a removable cover and the salt put in as a solid cake previously prepared in its correct shape.

When part 1 is constructed in a parallelepipedic form the ice bag may become an ice water bottle (as shown in Fig. 5) where the resilient part 2 can be wrapped around for surgical purposes and the like. With this item (ice bag, ice cap etc.) control of temperature may be obtained by changing the section of the holes in partition 12, f. i. by shifting a perforated disk 15 (Fig. 3) sideways, parallel to the partition 12 by means of an eccentric for example, which revolves in 12 and can be adjusted by a screwdriver from the opening on the top (removing the knob 13) through a hole in the salt cake. To form this hole, necessary for pouring in the water and for introducing the screwdriver to adjust the temperature, a rod is put into the salt before it solidifies and removed afterwards.

Fig. 6 illustrates a cooling unit in position for rapid regeneration of the used up salt charge providing a large evaporating surface while the solution is boiling. As soon as the right concentration of the solution is reached, the device is turned up 90 degrees, thus bringing part 1 and the liquid salt to the bottom where it solidifies. Here too, a rod 16 is introduced, being screwed in before regeneration starts and removed after complete solidification of the salt, leaving a hole in the latter (Fig. 8). A suitable number of holes 17 are provided to discharge the steam during the regeneration; they are closed afterwards, while the concentrated solution solidifies (Fig. 7), by special plugs 18 which are equipped with resilient surfaces on their inside, to be moved by screw 19 or by a suitable thermostatic device, increasing or decreasing the intimacy of contact between salt and water, when the cooler is in action.

While Fig. 6 shows the position of regeneration and Fig. 7 the position of solidification of the salt, Fig. 8 embodies the position of the refrigerator when it is ready for functioning, i. e. ready to receive the water which is poured in through the hole left in the salt by removing rod 16 as mentioned above. In this position part 1 is at the top and the resilient surfaces of the plugs 18 are to be moved inwards achieving a close contact between salt and water.

I claim as my invention:

1. A casing made in its upper part of rigid material, in its lower part of resilient material like rubber and the like connected in an airtight manner with the upper part of said casing, a formation of a compacted mass of refrigerating material in said upper part, a solvent body in said lower part and a pervious partition in between to let the solvent penetrate into said upper part contacting said refrigerating mass, when a pressure is exerted from outside upon said yielding part.

2. A casing made in its upper part of rigid material, in its lower part of yielding material, a formation of a compacted mass of refrigerating material in said upper part, a solvent body in said lower part and a pervious partition in between to let the solvent penetrate into said upper part contacting said refrigerating mass, when a pressure is exerted from outside upon said yielding part, and means for changing the permeability of said partition for controlling the passage of solvent into said upper part and consequently the production of cold and temperature attained.

3. A casing as described in claim 1, but constructed in its upper and lower part so flat that it can be used filled with hot water just like a hot water bottle, and filled with refrigerating material in said upper part and solvent in said lower part as a "chilling water bottle."

ARMIN H. RODECK.

REFERENCES CITED

The following references are of record in the file of this patent:

UNITED STATES PATENTS

| Number | Name | Date |
|---|---|---|
| 1,525,168 | Davidson | Feb. 3, 1925 |
| 2,336,571 | Rodeck | Dec. 14, 1943 |

FOREIGN PATENTS

| Number | Country | Date |
|---|---|---|
| 368,447 | Italy | Feb. 16, 1939 |